US012626450B1

(12) United States Patent
Johnson et al.

(10) Patent No.: US 12,626,450 B1
(45) Date of Patent: May 12, 2026

(54) POINT CLOUD ENHANCEMENT USING AN INFILL MASK AND SYNTHESIZED REPRESENTATION

(71) Applicant: Apple Inc., Cupertino, CA (US)

(72) Inventors: Magnus H Johnson, San Francisco, CA (US); Eric Geusz, San Francisco, CA (US); Jeremy R Bernstein, San Francisco, CA (US); Novaira Masood, San Jose, CA (US); Pravalika Avvaru, Union City, CA (US); Randal W Lamore, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 671 days.

(21) Appl. No.: 17/933,045

(22) Filed: Sep. 16, 2022

Related U.S. Application Data

(60) Provisional application No. 63/247,768, filed on Sep. 23, 2021.

(51) Int. Cl.
| | |
|---|---|
| *G06T 15/10* | (2011.01) |
| *G06T 5/50* | (2006.01) |
| *G06T 5/77* | (2024.01) |
| *G06V 20/64* | (2022.01) |

(52) U.S. Cl.
CPC ................ *G06T 15/10* (2013.01); *G06T 5/50* (2013.01); *G06T 5/77* (2024.01); *G06V 20/64* (2022.01); *G06T 2207/10028* (2013.01); *G06T*
2207/20081 (2013.01); *G06T 2207/20084* (2013.01); *G06T 2210/56* (2013.01)

(58) Field of Classification Search
CPC .. G06T 15/10; G06T 5/50; G06T 5/77; G06T 2207/10028; G06T 2207/20081; G06T 2207/20084; G06T 2210/56; G06V 20/64
See application file for complete search history.

(56) References Cited

U.S. PATENT DOCUMENTS

| | | | | |
|---|---|---|---|---|
| 2020/0334894 | A1* | 10/2020 | Long | G06T 13/00 |
| 2021/0133936 | A1* | 5/2021 | Chandra | G06T 5/50 |
| 2021/0312710 | A1 | 10/2021 | Fathi et al. | |
| 2022/0189104 | A1* | 6/2022 | Wetzstein | G06N 3/08 |
| 2023/0026278 | A1* | 1/2023 | Vianello | G06V 20/176 |

* cited by examiner

*Primary Examiner* — Emily C Terrell
*Assistant Examiner* — Dominique James
(74) *Attorney, Agent, or Firm* — Alexander A. Knapp; Kowert, Hood, Munyon, Rankin & Goetzel, P.C.

(57) ABSTRACT

A point cloud having occluded regions may be infilled with additional points by creating an infill mask and a synthesized representation, wherein the synthesized representation comprises generated information for points of the occluded regions. The infill mask and the synthesized representation may both be generated using a 2D version of the point cloud generated by rasterizing the 3D point cloud and respectively using a first and second machine learning techniques to generate the infill mask and the synthesized representation. Points identified in the occluded regions may be selected, matched with the information generated in the synthesized representation, and infilled into the point cloud.

19 Claims, 12 Drawing Sheets

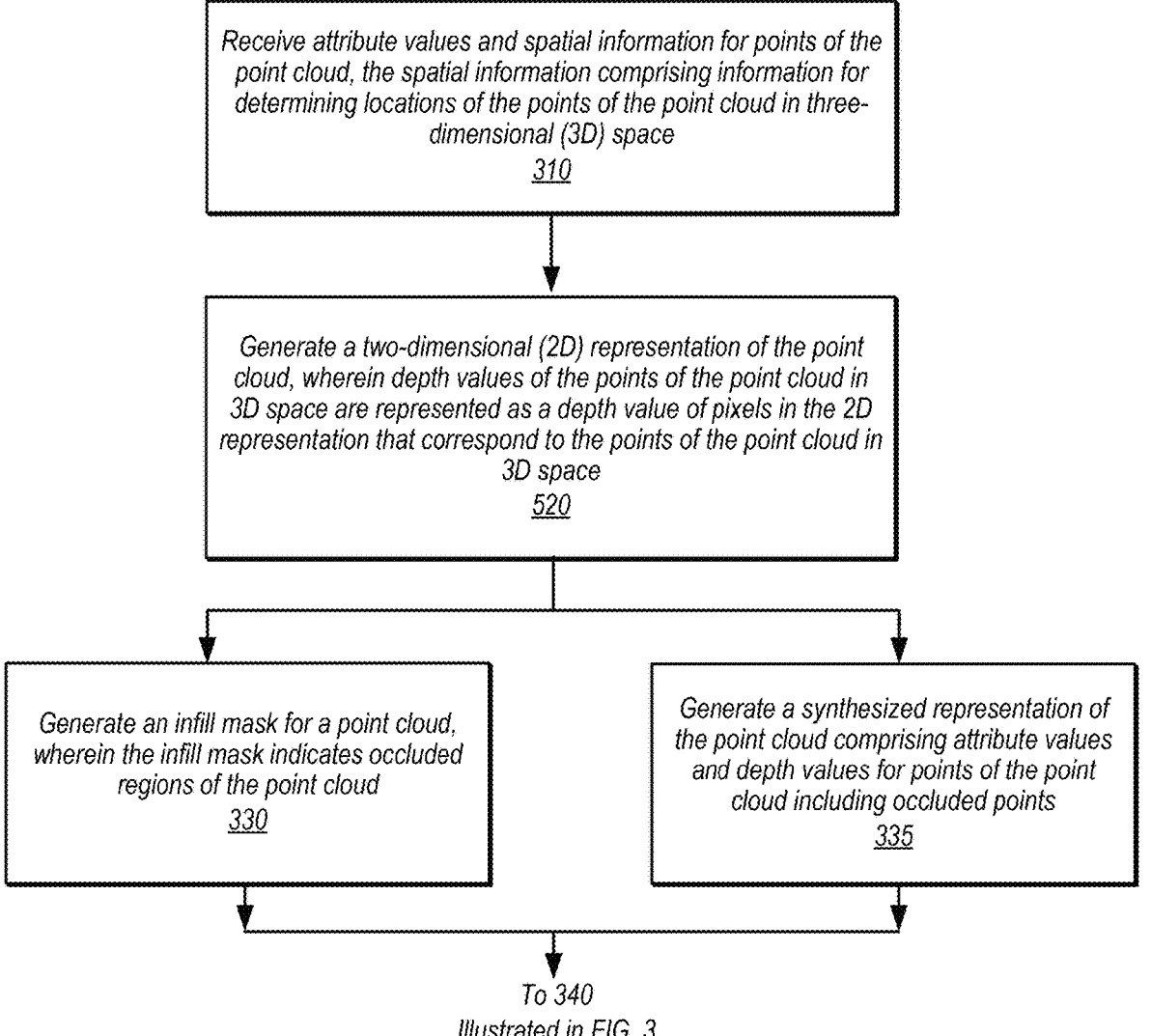

Receive attribute values and spatial information for points of the point cloud, the spatial information comprising information for determining locations of the points of the point cloud in three-dimensional (3D) space
310

Generate a two-dimensional (2D) representation of the point cloud, wherein depth values of the points of the point cloud in 3D space are represented as a depth value of pixels in the 2D representation that correspond to the points of the point cloud in 3D space
520

Generate an infill mask for a point cloud, wherein the infill mask indicates occluded regions of the point cloud
330

Generate a synthesized representation of the point cloud comprising attribute values and depth values for points of the point cloud including occluded points
335

To 340
Illustrated in FIG. 3

FIG. 5

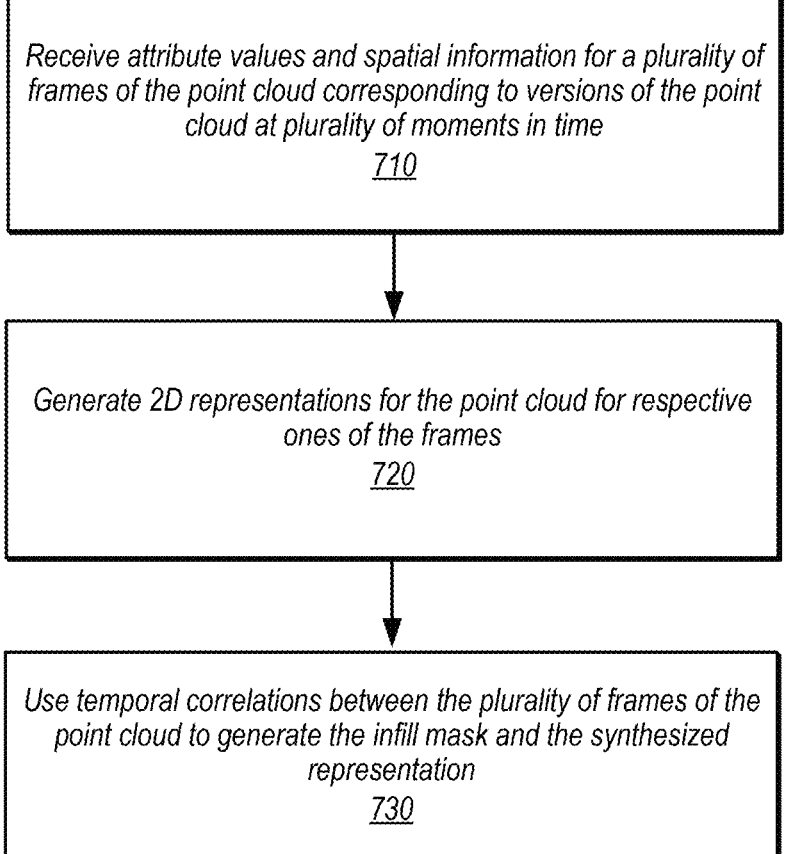

Receive attribute values and spatial information for a plurality of
frames of the point cloud corresponding to versions of the point
cloud at plurality of moments in time
710

Generate 2D representations for the point cloud for respective
ones of the frames
720

Use temporal correlations between the plurality of frames of the
point cloud to generate the infill mask and the synthesized
representation
730

*FIG. 7*

POINT CLOUD ENHANCEMENT USING AN INFILL MASK AND SYNTHESIZED REPRESENTATION

This application claims benefit of priority to U.S. Provisional Application Ser. No. 63/247,768, entitled "Point Cloud Enhancement Using an Infill Mask and Synthesized Representation," filed Sep. 23, 2021, and which is hereby incorporated herein by reference in its entirety.

BACKGROUND

Technical Field

This disclosure relates generally to techniques for rendering a scene from a point cloud using an infill mask.

Background

Various types of sensors, such as light detection and ranging (LiDAR) systems, 3D-cameras, 3D scanners, etc. may capture data indicating positions of points in three-dimensional (3D) space, for example positions in the X, Y, and Z planes. Also, such systems may further capture attribute information in addition to spatial information for the respective points, such as color information (e.g., RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands, hundreds of thousands, millions, or a greater number of points. Also, in some circumstances, point clouds may be generated, for example in software, as opposed to being captured by one or more sensors.

SUMMARY

In some aspects, a point cloud infill module is configured to generate an infill mask for a point cloud using a first machine learning algorithm, wherein the infill mask indicates occluded regions of the point cloud. For example, for various regions some points of a point cloud in an occluded region may be omitted from a captured point cloud. As an example, sensors that capture the point cloud may be obstructed such that information for the points in the occluded region is not captured. The point cloud infill module is further configured to generate, using a second machine learning algorithm, a synthesized representation of the point cloud. In some aspects, to generate the infill mask and the synthesized representation, a version of the point cloud in three-dimensional space (e.g., 3D) may be converted to a two-dimensional representation (e.g., 2D), wherein the 2D representation is used by the first and second machine learning algorithms to generate the infill mask and the synthesized representation. In some aspects, the second machine learning algorithm may determine values for pixels of a 2D representation corresponding to occluded points based on values for other non-occluded points that are included in the 2D representation provided to the second machine learning algorithm. Various machine learning techniques as further described herein may be used to implement the first and second machine learning algorithms that generates the infill mask and the synthesized representation.

The point cloud infill module may use the infill mask and the synthesized representation to at least partially infill the occluded regions of the point cloud. For example, instead of randomly adding points to the point cloud, or adding points without regard to which regions are occluded or not, the point cloud infill module may use the infill mask to determine regions of the point cloud that are occluded and therefore need more points. The point cloud infill module may further use the synthesized representation to determine values to assign to points to be added at locations determined using the infill mask. For example, pixels in occluded regions of the infill mask may be sampled to determine points to be added to the point cloud, and corresponding pixels in the synthesized representation may be used to determine depth and/or other attribute values, such as color values to be assigned to the points to be added to the point cloud in the occluded regions (as determined from the infill mask). The point cloud infill module may further include the added points in the occluded regions in an augmented (e.g., infilled) version of the point cloud. In some aspects, the point cloud infill module may be implemented on an encoder side, wherein the point cloud is augmented with additional points added to occluded regions prior to being encoded. In some aspects, the point cloud infill module may be implemented on a decoder side, wherein a received point cloud is infilled as part of reconstructing a reconstructed version of the point cloud from a received encoded version of the point cloud. In some aspects, a point cloud infill module may be implemented at both an encoder side and a decoder side. Also, in some aspects, a point cloud infill module may be implemented in other locations, such as in a network between an encoder and decoder.

BRIEF DESCRIPTION OF THE DRAWINGS

FIG. 5 illustrates generation of a 2D representation of the point cloud from a 3D representation by converting, for respective ones of the points of the point cloud, one or more of the spatial values of the respective point into an additional attribute value of a 2D pixel corresponding to the respective point (e.g., representing depth for the respective point as an attribute of a pixel corresponding to the respective point), according to some aspects.

Figure 6:
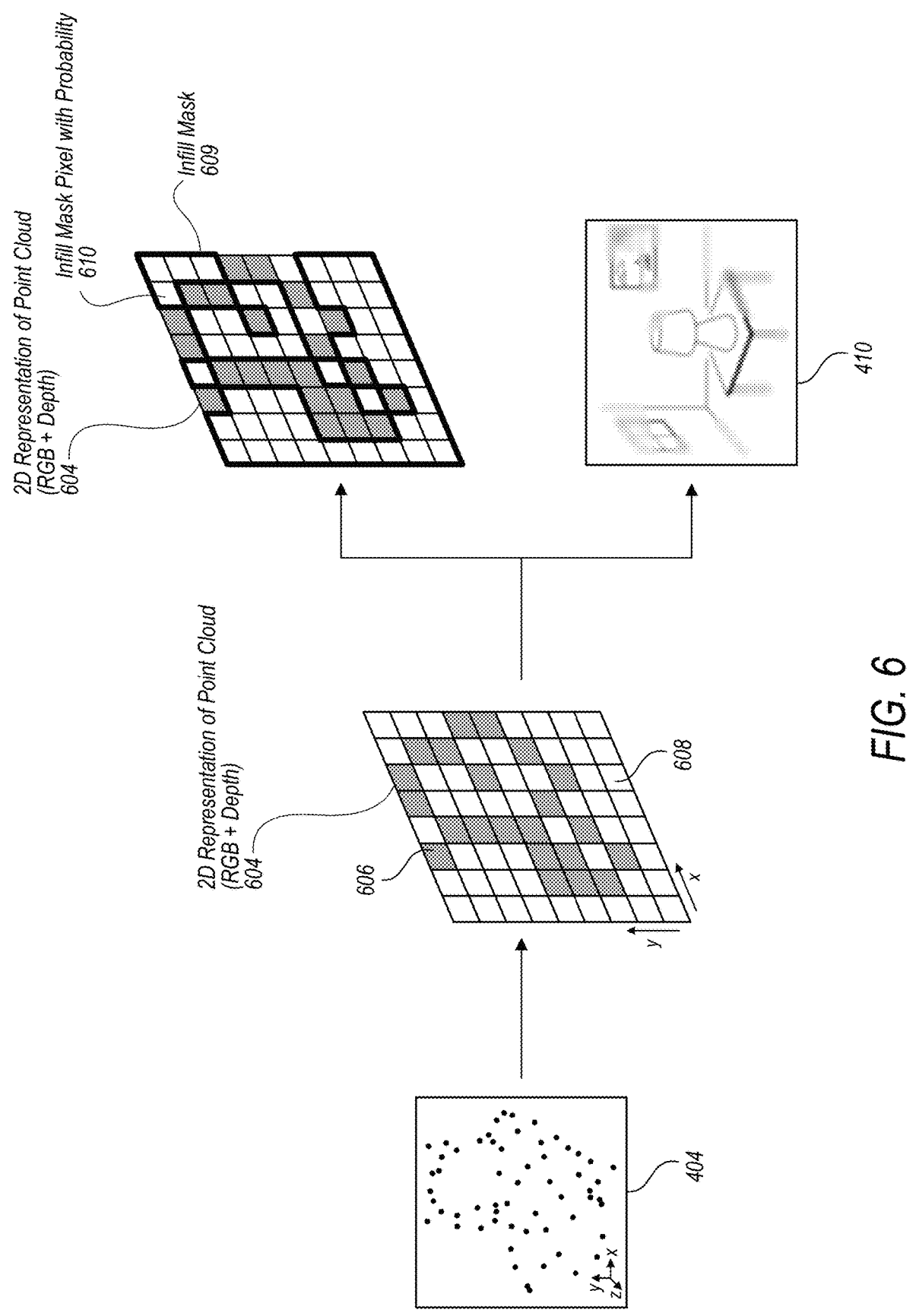

FIG. 6 further illustrates generation of an example 2D representation of the point cloud described in FIG. 5, according to some aspects.

FIG. 7 illustrates example uses of temporal correlations between a plurality of frames of the point cloud to generate an infill mask and a synthesized representation, according to some aspects.

Figure 8:
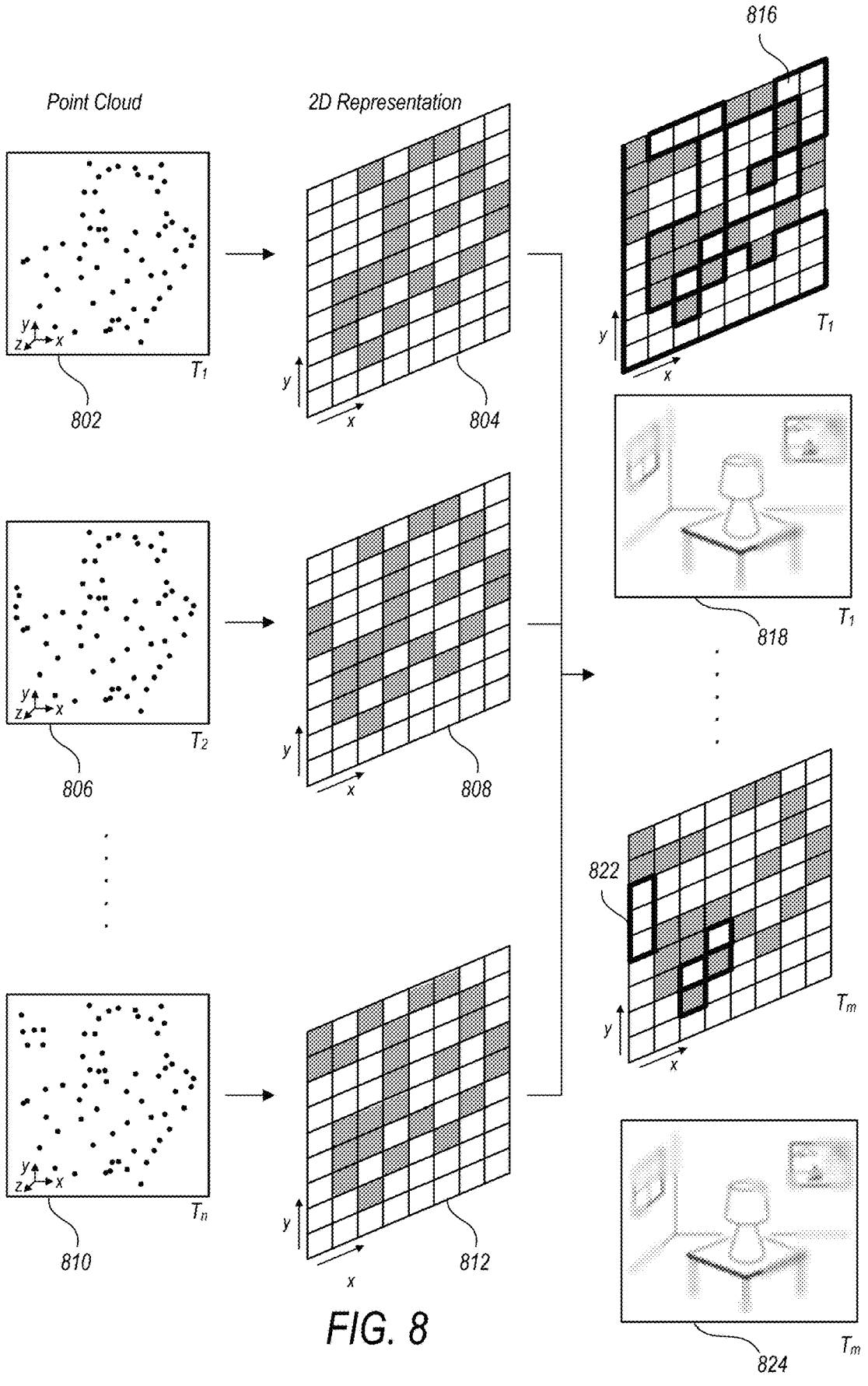

FIG. 8 illustrates an example use of temporal correlations between the plurality of frames of the point cloud to generate the infill mask and the synthesized representation, according to some aspects.

Figure 9:
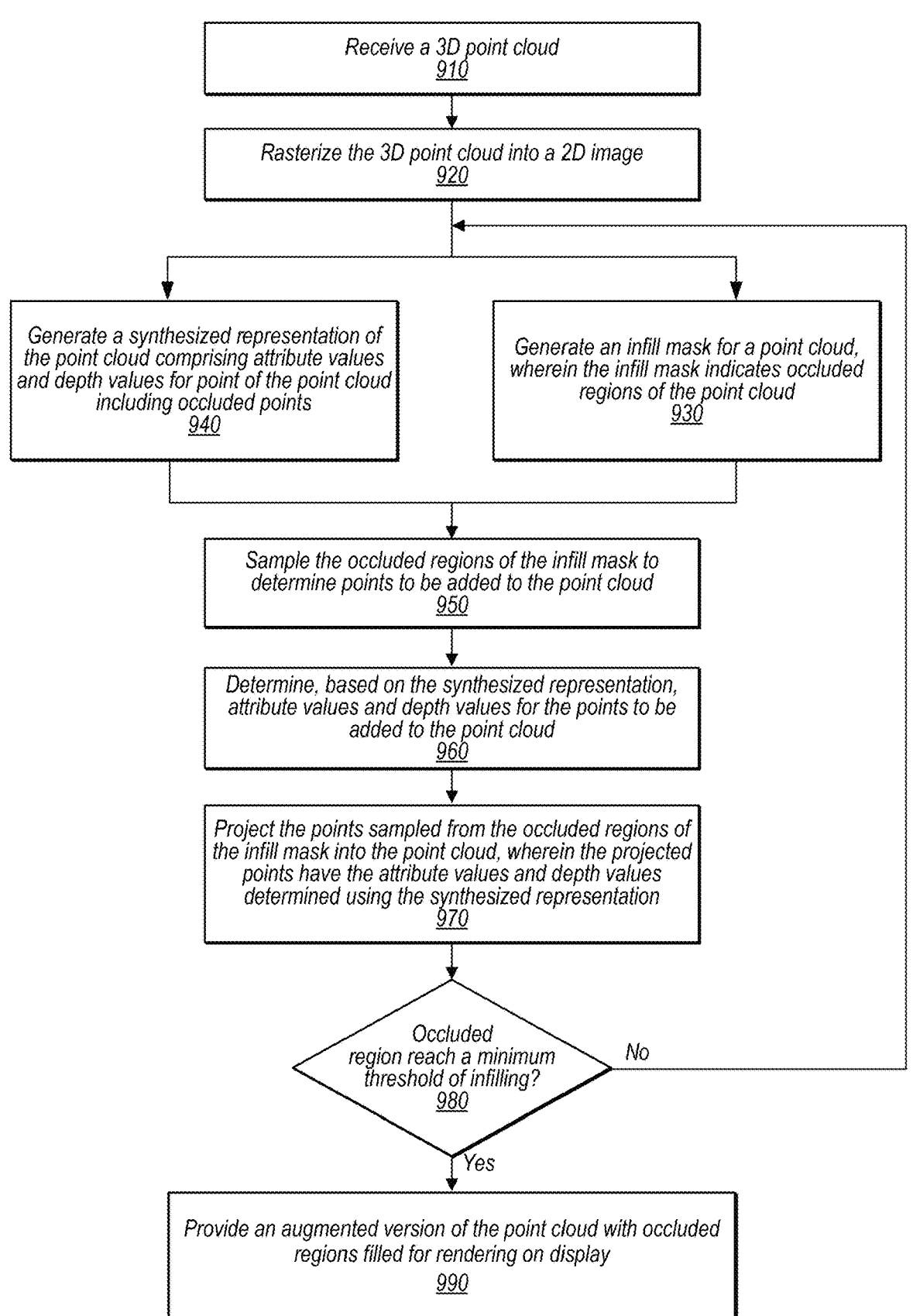

FIG. 9 illustrates iterative generation of infill masks and synthesized representations, wherein a point cloud that was at least partially filled in during a previous round is used as an input for a subsequent round of infilling, according to some aspects.

Figure 10:
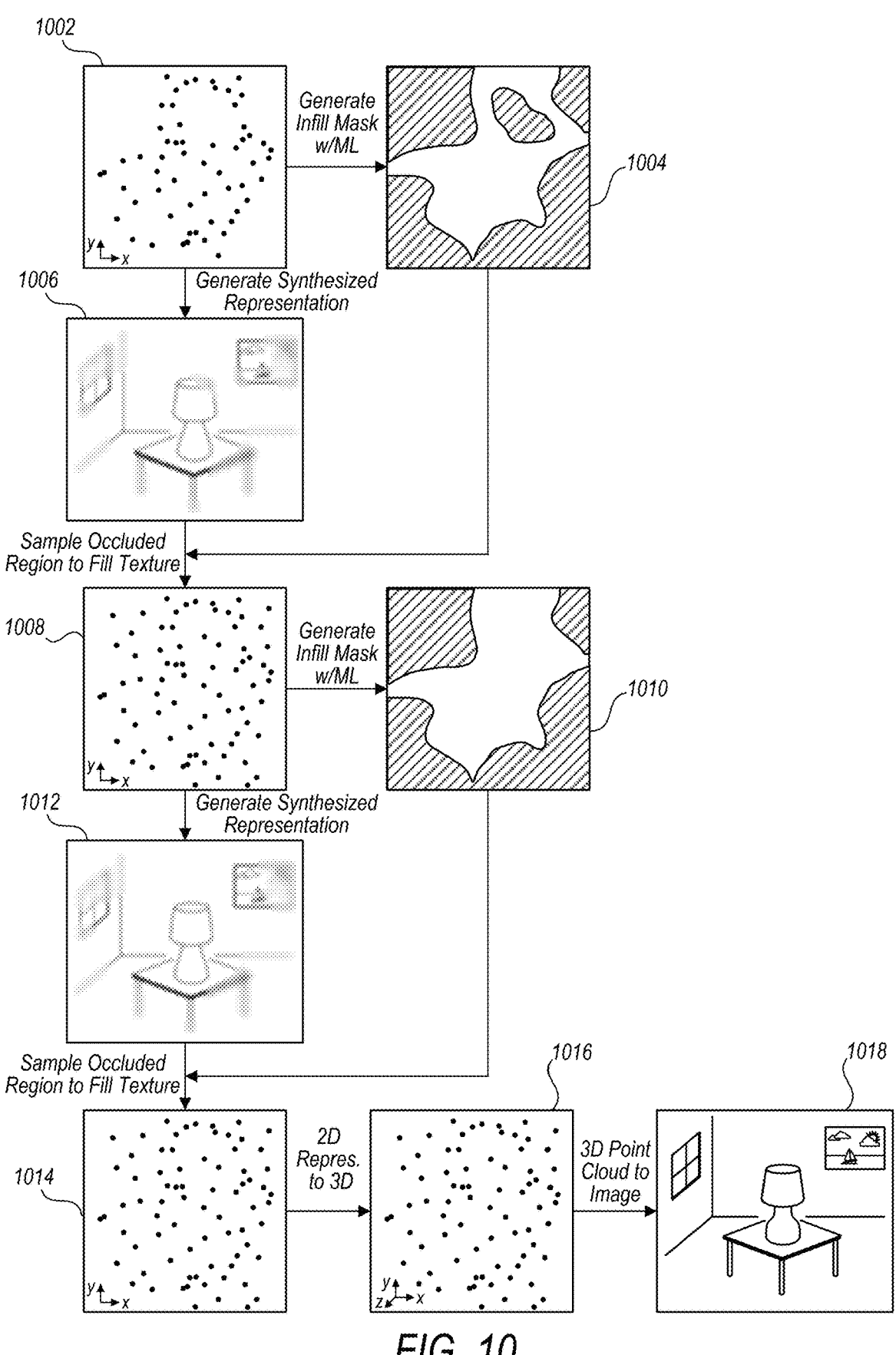

FIG. 10 illustrates an example use of iterative generation of infill masks and synthesized representations, according to some aspects.

Figure 11:
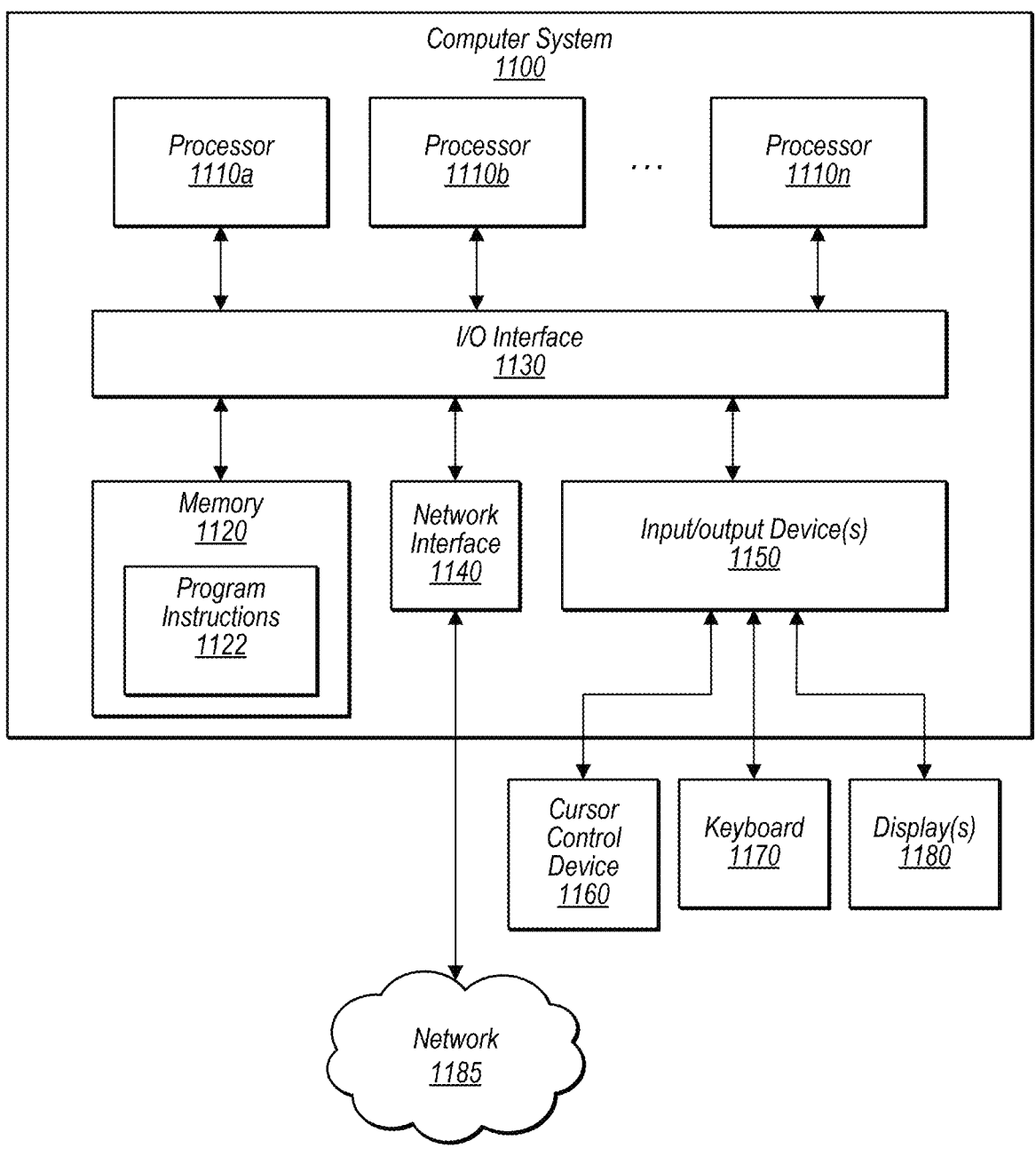

FIG. 11 illustrates an example computer system that may implement an encoder, a decoder, an infill module, a renderer, or various other components described herein, according to some aspects.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

As data acquisition and display technologies have become more advanced, the ability to capture point clouds comprising thousands or millions of points in 3-D space, such as via LiDAR systems, has increased. Also, the development of advanced display technologies, such as virtual reality or augmented reality systems, has increased potential uses for point clouds. These captured point clouds may be utilized to generate or recreate scenes of the captured environment. The rendered scenes may be applied to various applications ranging from co-presence calls that may bring together multiple users virtually into a shared environment, to visualization of a layout of an interior of a home. However, scenes rendered from point clouds are often dependent on the quality of the point clouds, one such quality being the density or sparseness of the points.

For example, a captured point cloud may have regions that are sparsely populated by points or that lack a sufficient number of points due to a given region of the point cloud being occluded by a surrounding environment when the point cloud was captured or generated. For example, various regions of the point cloud may be occluded behind objects in the environment that act as a barrier that prevents LiDAR systems, other point cloud sensors, or graphics generating applications, from obtaining or generating information about the occluded points. Also, information for points may be occluded due to a certain reflective nature of surfaces in the environment preventing proper engagement with sensors used to capture the point cloud. In some aspects, points may be occluded for various other reasons. In some aspects, a point cloud may be captured using LiDARs, 3D laser scanners, digital cameras applying photogrammetry, and other sensors capable of generating 3D point cloud information. In some aspects instead of one or more sensors capturing the point cloud, a scene generator may generate the information for the points of the point cloud. For example, a point cloud may be generated in software, such as via computer graphics.

Relying on sensors to acquire additional information about points of occluded regions of a point cloud may not be effective due to the delay introduced in acquiring the information about the additional points as well as a delay associated with the transfer of point cloud information for the additional point to a rendering device. For example, transmission may be delayed while waiting for the additional information to be acquired. Moreover, often times points are occluded due to limitations related to viewing angles, etc. Thus, attempting to acquire information about occluded points directly using a sensor may be cumbersome to a user, such as requiring the user to move about a room to avoid objects in a line of sight of the sensor. For example, requiring sensors to be used to collect information about additional points in occluded regions may limit some uses of point cloud data, such as real-time uses.

In some aspects, in order to improve the quality of a scene rendered from obtained or generated point cloud data, occluded regions of the point cloud may be infilled with points that are generated using machine learning techniques. In order to infill the occluded regions, a 3D point cloud may be used to generate a 2D representation that rasterizes the points into a two-dimensional (2D) representation of the point cloud. In some aspects, the 2D representation may transform one of the position values of the points of the point cloud in the X, Y, or Z planes into a depth value. The 2D representation may comprise a series of pixels, dots, lines, etc. corresponding to the 3D point cloud information, with one of the position values represented as an attribute value of the pixels, dots, lines, etc. In some aspects, the 2D representation of the point cloud may further include other attribute values for the respective points such as color information (e.g., RGB values), intensity attributes, reflectivity attributes, motion related attributes, modality attributes, or various other attributes. Using the 2D representation, a first type of machine learning technique may be applied to determine regions of the 2D representation that correspond to occluded regions of the point cloud. In some aspects, occlusion probabilities, such as a value between 0 and 1, may be assigned to respective pixels of an infill mask, wherein the probability values represent which regions of the point cloud are likely occluded regions.

In some aspects, the 2D representation may further be used to generate a synthesized representation of the scene using various second types of machine learning techniques. In some aspects, a neural point-based graphics (NPBG) technique may be used to generate a synthesized representation. In some aspects, an NPBG technique attaches "descriptors" to points of the point cloud. The NPBG technique further rasterizes the points in 3D space to generate a texture or other 2D representation of the points. The NPBG technique further trains a convolutional neural network to reproduce 2D images using the texture or other 2D representation, wherein the reproduced 2D images include occluded regions filled in with additional 2D points (e.g., pixels) having attribute values generated by the convolutional neural network based on attribute values of other 2D points (e.g., pixels) included in the texture or 2D representation. For example, attribute values for pixels corresponding to occluded points may be learned from attribute values of pixels corresponding to surrounding non-occluded points. In some aspects that use NPBG, the "descriptors" of the points of the point cloud are learned for every new point-cloud scene. In some aspects, the NPBG may require back-propagation for each new version of the point cloud, such as different frames, wherein the point cloud is captured at different frames corresponding to different representations of the point cloud at different moments in time.

In some aspects, a simplified NPBG technique may be used wherein the neural descriptors are not learned, but instead a vector representing RGB color components and depth are considered to be the descriptors. In some aspects, the NPBG techniques may be used with 2D representations from a series of versions of a point cloud obtained over successive moments in time or frames. A neural network may be trained to fill in a current frame using information described in one or more previous frames by adding one or more recurrent convolutional Long Short-Term Memory (LSTM) layers in the network. Using this technique, the network may pass information from one frame to the next frame, thereby storing information related to previous fame data the network has seen before and using it to make decisions. In some aspects, a Consistent Video Depth Estimation (CVDE) technique may be used to minimize temporal inconsistencies between multiple frames. In some aspects, a CVDE technique may leverage a structure generated for motion reconstruction of the point cloud to establish geometric constraints, apply a convolutional neural network (CNN) trained for a single-image depth estimation, and fine-tune the CNN to satisfy the geometric constraints of the 2D representation generated using the structure leveraged from the motion reconstruction.

The various NPBG techniques discussed herein may utilize Generative Adversarial Networks (GANs) instead of, or in addition to, the CNN. In some aspects, the synthesized representation of the scene may be obtained using GAN-based reconstruction. In some aspects, a specialized conditional GAN (cGAN) network may be used to generate a more detailed synthesized representation using the 2D representation. In some aspects, the GAN-based reconstruction may utilize 2D representations from a series of point cloud versions obtained over a period of time or successive frames. The GAN or cGAN or other types of GANs may be trained to fill in occluded portions of a current frame using information described in previous frames. Using this technique, a network implemented in the first or the second machine learning technique passes information from one frame to the next frame, thereby holding information for previous data the network has seen before and using it to make decisions for other frames. In some aspects, a TecoGAN or other elements of a TecoGAN, such as a spatio-temporal discriminator and recurrent generator network, may be used. In some aspects a Pix2Pix GAN-based reconstruction may be used to generate a synthesized representation of the scene wherein such a type of GAN not only learns the mapping from the input 2D representation to the output 2D representation but also learns a loss function to train the mapping. In some aspects, a sinusoidal representation networks (SIRENs) may be used instead of, or in addition to, a GAN. A SIREN may be a simple multi-layer perceptron that uses a periodic sine as the non-linearity that rapidly converges to obtain functions with high frequency details. In some aspects, the space of functions parameterized by a SIREN may use a convolutional encoder to present a latent space of the images and map the parameters of the SIREN according to a fully connected hypernetwork. In some aspects a Completion-GAN may be used to generate the synthesized representation. CompletionGAN may run asynchronously from several perspectives of rasterized point clouds. In some aspects, the several perspectives of the rasterized point clouds may be different perspectives at the same moment in time. In some aspects, each point clouds of the rasterized point cloud may be captured using different sensors.

Using the infill mask and the synthesized representation, wherein the synthesized representation may be generated using any of the machine learning techniques described above, the occluded points from the infill mask may be infilled with information drawn from the synthesized representation. The infilled 2D representation may then be mapped back into a 3D space of a modified point cloud that is augmented with additional points at least partially filing in occluded regions. In some aspects, the infilling of the occluded regions may occur before the point cloud information is encoded and communicated over a network. In some aspect, the infilling of the occluded regions of the point cloud may occur after being communicated over the network and decoded. For example, a point cloud infill module may be implemented on a user device that captures and encodes a point cloud or a user device that receives and renders a point cloud. In some aspects, a point cloud infill module may be implemented in a third device that receives and passes along a point cloud between a capturing device and a rendering device.

Figure 1A:
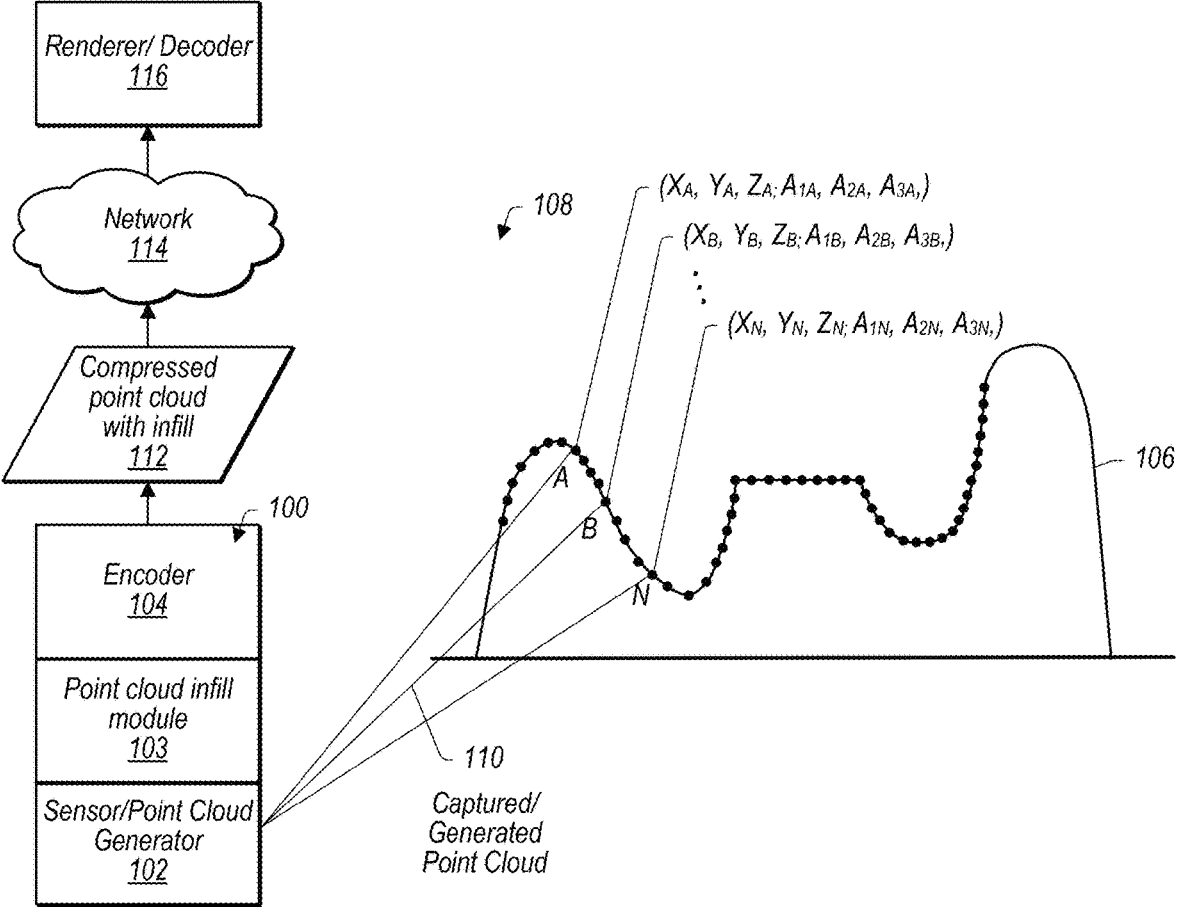
FIG. 1A illustrates a system comprising a sensor that captures information for points of a point cloud (or a generator that generates the information for the points of the point cloud) and an encoder-side infill module that infills occluded portions of the point cloud, wherein the infilled version of the point cloud is encoded and sent to a renderer or decoder, according to some aspects.

FIG. 1A illustrates a system comprising a sensor that captures information for points of a point cloud (or a point cloud generator that generates the information for the points of the point cloud) and a point cloud infill module that infills occluded regions, wherein the infilled point cloud information is sent to a renderer or decoder, according to some aspects.

System 100 includes sensor/point cloud generator 102 and encoder 104. Sensor 102 captures a point cloud 110 comprising points representing a scene 106 in view 108 of sensor 102. In some aspects, the point cloud 110 may be obtained using LiDARs, 3D laser scanners, digital cameras applying photogrammetry, and other point cloud sensors capable of generating 3D point cloud information. In some aspects instead of one or more sensors 102 capturing the point cloud 110 of the scene 106, a scene generator 102 that generates the information for the points of a point cloud may provide the point cloud 110 of the scene 106 to be rendered. In some aspects, scene 106 may be a person, a room, a landscape, a building, a sign, an environment surrounding a street, or any other type of structure. In some aspects, a captured/generated point cloud 110 may include spatial and attribute information for the points included in the point cloud. For example, point A of captured point cloud 110 comprises X, Y, Z coordinates and attributes 1, 2, and 3. In some aspects, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. In some aspects the captured point cloud 110 may include one or more occluded regions wherein the regions failed to include points from the structure 106. In some aspects, the one or more occluded regions may arise due to points being hidden when the point cloud was captured from a first point of view as compared to a second point of view. In some aspects, various regions of the environment may be occluded behind objects acting as a barrier that prevents LiDAR systems or other point cloud sensors from obtaining attribute values or locations of points or may be occluded due to a certain reflective nature of surfaces preventing proper engagement with the sensors. The one or more occluded regions may be described herein as regions in the point cloud wherein the points are sparsely populated as compared to other regions of the point cloud. In some aspects, the point cloud infill module 103 may identify the one or more occluded regions of the structure 106 and generate additional points to infill back into the captured or generated point cloud 110 as further illustrated in FIGS. 2-10. In some aspects, an occluded region may be differentiated from a sparse region by a point cloud infill module. For example, some regions of a point cloud may be sparse because the actual point cloud only includes a small number of points in the region, while an occluded region may be sparse because not all points included in the region were captured. In some aspects, an infill mask may differentiate between naturally sparse regions and occluded regions.

The captured point cloud 110 that has been infilled may be provided to encoder 104, wherein encoder 104 generates a compressed version of the point cloud 112 that is transmitted via network 114 to renderer and/or decoder 116. In some aspects, a compressed version of the point cloud 112 may be included in a common compressed point cloud that also includes compressed spatial information for the non-occluded points of the point cloud or, in some embodiments, compressed spatial information and compressed attribute information may be communicated as separate files. In some aspects, encoder 104 may be integrated with sensor/point cloud generator 102 or with the point cloud infill module 103. For example, encoder 104 may be implemented in hardware or software included in a sensor device, such as a LiDAR sensor. In other embodiments, encoder 104 may be implemented on a separate computing device that is proximate to sensor 102. In some embodiments, the point cloud infill module 103 and the encoder 104 may be implemented in the same hardware and software. The renderer and/or decoder 116 receives the compressed point cloud with infill 112 and renders and/or decodes the augmented (e.g., infilled) point cloud for display.

Figure 1B:
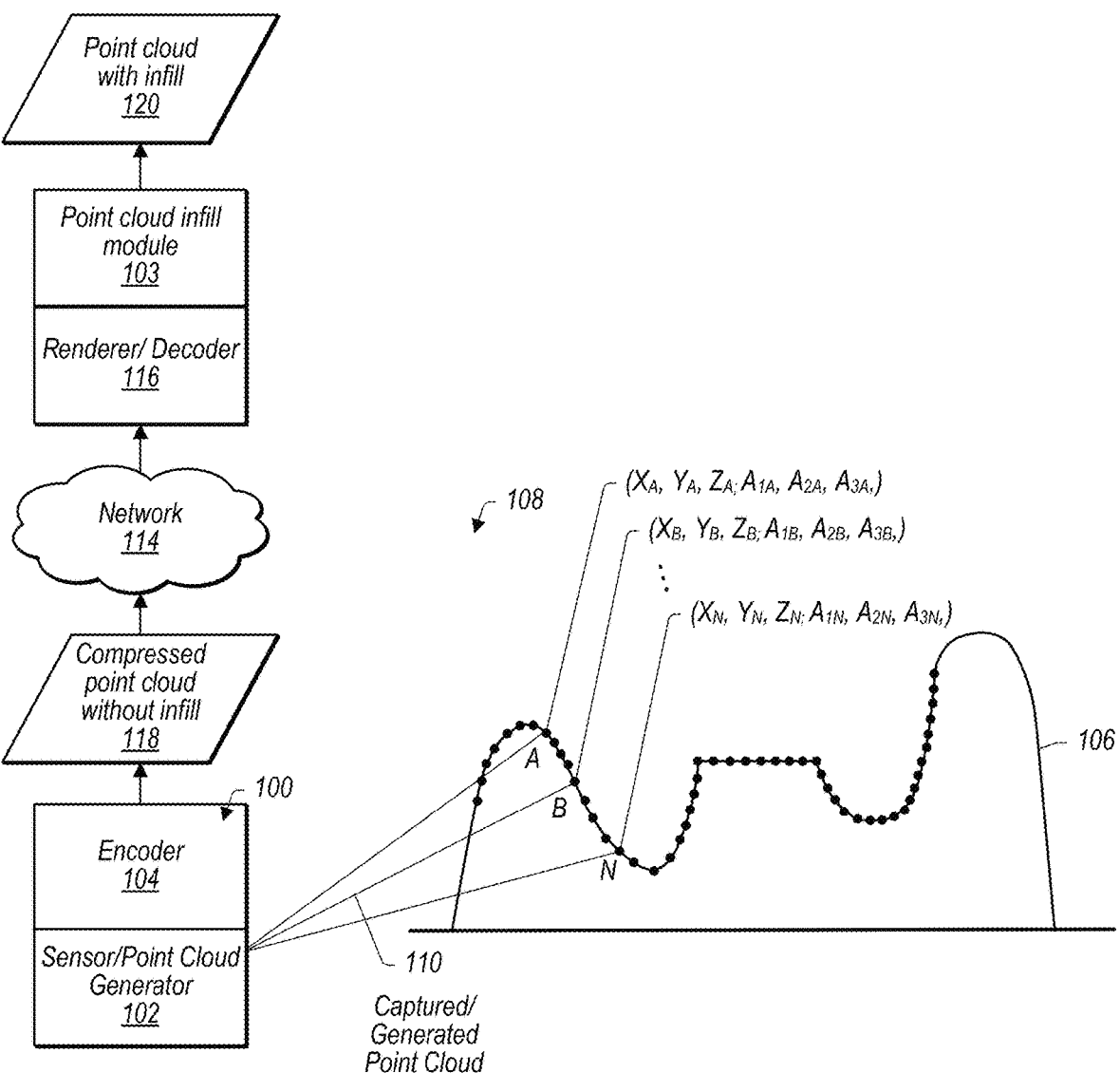
FIG. 1B illustrates a system comprising a sensor that captures information for points of a point cloud (or a generator that generates the information for the points of the point cloud) and a renderer/decoder-side infill module that infills occluded portions of the point cloud, wherein the infilled version of the point cloud is rendered via a renderer or decoder, according to some aspects.

FIG. 1B illustrates a system comprising a sensor that captures information for points of a point cloud (or a generator that generates the information for the points of the point cloud) and sends the information over a network to a renderer or decoder that includes an infill module that infills occluded regions of the point cloud to generate an infilled version of the point cloud, according to some aspects.

Similar to that of FIG. 1A, FIG. 1B illustrates a system 100 that includes sensor/point cloud generator 102 and encoder 104. Sensor 102 captures a point cloud 110 comprising points representing a scene 106 in view 108 of sensor 102. In some embodiments, the point cloud 110 may be obtained using LiDARs, 3D laser scanners, digital cameras applying photogrammetry, and other point cloud sensors capable of generating 3D point cloud information. In some embodiments instead of one or more sensors 102 capturing the point cloud 110 of the scene 106, a scene generator 102 that generates the information for the points of a point cloud may provide the point cloud 110 of the scene 106. In some embodiments the captured point cloud 110 may include one or more occluded regions wherein the sensor 102 or point cloud generator 102 failed to capture points from the structure 106. The captured point cloud 110 may be provided to encoder 104, wherein encoder 104 generates a compressed version of the point cloud without the infill 118 that is transmitted via network 114 to renderer and/or decoder 116. In some aspects, a compressed version of the point cloud 118 may be included in a common compressed point cloud that also includes compressed spatial information for the points of the point cloud or, in some embodiments, compressed spatial information and compressed attribute information may be communicated as separate files. In some aspects, encoder 104 may be integrated with sensor/point cloud generator 102. For example, encoder 104 may be implemented in hardware or software included in a sensor device, such as a LiDAR. In other embodiments, encoder 104 may be implemented on a separate computing device that is proximate to sensor 102.

The renderer and/or decoder 116 receives the compressed point cloud without infill 118 and renders and/or decodes the compressed point cloud to recreate the captured point cloud 110. In some aspects, the point cloud infill module 103 may identify one or more occluded regions of the reconstructed point cloud and generate additional points to infill back into the reconstructed point cloud to generate a point cloud with infill 120 as further illustrated in FIGS. 2-10. In some aspects, the point cloud infill module 103 may be implemented in the same hardware and software as the renderer/decoder 116.

Figure 2:
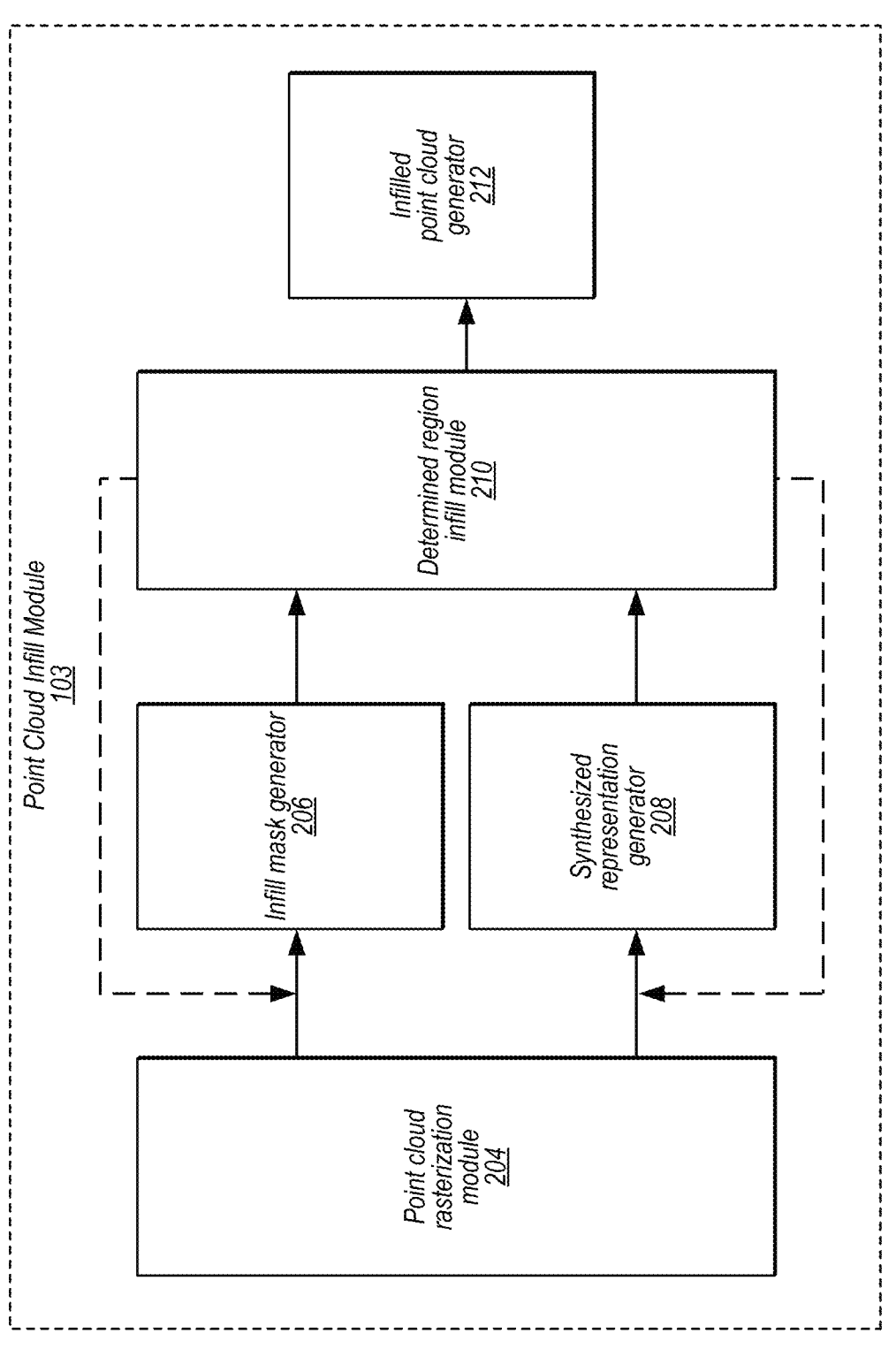
FIG. 2 illustrates a point cloud infill module that takes in information for points of a point cloud, generates an infill mask and a synthesized representation of the point cloud, and infills occluded regions, according to some aspects.

FIG. 2 illustrates a point cloud infill module that takes in information for points of a point cloud, generates an infill mask and a synthesized representation of the point cloud, and infills occluded regions using the infill mask and the synthesized representation, according to some aspects. A point cloud infill module 103 may comprise a point cloud rasterization module 204 that receives a point cloud from one or more sensors. The point cloud may have been captured using a variety of point cloud sensors including LiDAR, 3D laser scanners, digital cameras applying photogrammetry, etc. In some aspects instead of one or more sensors capturing the point cloud, a scene generator that generates the information for the points of the point cloud may provide the point cloud to point cloud infill module 103. The point cloud may be rasterized into a two-dimensional (2D) representation of the point cloud, e.g., a "2D representation" by point cloud rasterization module 204. In some aspects, the 2D representation may transform one of the position values in the X, Y, and Z planes into a depth value for pixels of the 2D representation. For example, the point cloud rasterization module 204 may rasterize the 3D point cloud into the 2D representation having a series of pixels, dots, lines, or other shapes corresponding to the points of the 3D point cloud. In some aspects, the 2D representation of the point cloud may further include attribute values such as color information (e.g., RGB values), intensity attributes, reflectivity attributes, motion related attributes, modality attributes, or various other attributes.

The 2D representation generated using the point cloud rasterization module 204 may be used by an infill mask generator 206 of the point cloud infill module 200 to generate an infill mask that indicates one or more regions of the rasterized point cloud that may need to be infilled. In some aspects, various machine learning models may be used by the infill mask generator 206 such as a convolutional neural network (CNN), a generative adversarial network (GAN), a conditional GAN (cGAN), or other types of machine learning algorithms that may be used to generate an infill mask. In some aspects, a neural network may be trained to generate the infill mask and distinguish between sparse regions of a point cloud that do not require infilling versus regions of a point cloud that are occluded and require infilling. In some aspects, the infill mask that is generated by the point cloud infill mask generator 206 may be run multiples times to more completely infill the one or more regions of the point cloud that are identified as occluded. For example, FIGS. 9 and 10 further describe iterative infilling techniques. In some aspects, an infill mask generator 206 may be configured to identify regions that were previously infilled and avoid layering the infill points on one another. In some aspects, a new updated infill mask and a new synthesized representation may be generated between iterations, wherein the new infill mask and the new synthesized representation use the points added as infill points in a previous iteration as source points for a subsequent iteration, wherein the source points are used to generate an updated infill mask and an updated synthesized representation.

The 2D representation generated using the point cloud rasterization module 204 may further be used by a synthesized representation generator 208 to create a synthesized 2D representation of the point cloud. In some aspects, the synthesized representation generator 208 may work in parallel with the infill mask generator 206. The synthesized representation generator 208 may generate a synthesized representation of the point cloud comprising attribute values and depth values for points of the point cloud including attribute values and depth values for the occluded points. The synthesized representation of the point cloud may utilize various machine learning techniques to generate the synthesized representation. For examples in some aspects, a neural point-based graphics (NPBG) technique may be used by the synthesized representation generator 208 to generate a synthesized representation. NPBG techniques attach "descriptors" to points of the point cloud, rasterize the points with attached descriptors into a texture or other 2D representation, and train a convolutional neural network using the rasterized 2D representation with attached descriptors, wherein the trained neural network is configured to reproduce images of the texture or other 2D representation with values for the occluded points added to the texture or 2D representation, such as depth values and color values. The added values are predicted based on known values of other pixels in the texture or other 2D representation, such as values for pixels corresponding to points that were not occluded in the point cloud used to generate the rasterized 2D representation. In NPBG the "descriptors" of the points of the point cloud may be learned from scratch for each version of a point cloud, or may be learned using a series of versions of the point cloud, such as multiple frames representing the point cloud at different moments in time. In some aspects, the NPBG may use backpropagation for new versions of the point cloud that are motion-based variations of previous versions of the point cloud. In some aspects, a simplified NPBG may be used wherein neural descriptors are not learned, but instead vectors representing RGB color components and depths are considered to be the descriptors that are learned for the respective pixels. In some aspects, NPBG techniques may be used with 2D representations from a series of versions of a point cloud obtained over successive moments in time or frames. A neural network may be trained to fill in values for occluded pixels in the current frame using information for the pixels described in the previous frames (where the pixels were not occluded in the previous frames) by adding one or more recurrent convolutional Long Short-Term Memory (LSTM) layers in the network. Using this technique, the network passes information from one frame to the next frame, thereby holding information on previous pixel data the network has seen before and using it to make decisions. In some aspects, a Consistent Video Depth Estimation (CVDE) technique may be used to minimize temporal inconsistencies between multiple frames. CVDE techniques may leverage a conventional structure-from-motion reconstruction of the point cloud to establish geometric constraints, apply a convolutional neural network (CNN) trained for single-image depth estimation, and fine-tune the CNN to satisfy the geometric constraints of the 2D representation.

In some aspects, the synthesized representation generator 208 that utilizes various NPBG techniques discussed herein may use as its neural network a Generative Adversarial Networks (GANs) instead of the CNN. In some aspects, the synthesized representation of the scene may be obtained using GAN-based reconstruction. The various NPBG techniques discussed herein may utilize a Generative Adversarial Networks (GANs) instead of the CNN. In some aspects, a specialized conditional GAN (cGAN) network may be used to generate a more detailed synthesized representation using the 2D representation. In some aspects, the GAN-based reconstruction may utilize 2D representations from a series of versions of the point cloud obtained over successive moments in time or frames. The GAN or cGAN or other types of GANs may be trained to fill in current pixel values in a current frame using information described in previous frames. Using this technique, the network passes information from one frame to the next frame, thereby holding information on previous pixel data the network has seen before and using it to make decisions. In some aspects, a TecoGAN or other elements of a TecoGAN, such as a spatio-temporal discriminator and recurrent generator network, may be used. In some aspects a Pix2Pix GAN-based reconstruction may be used to generate a synthesized representation of the scene wherein a type of GAN not only learns the mapping from the input 2D representation to the output 2D representation but also learns a loss function to train the mapping. In some aspects, a sinusoidal representation networks (SIRENs) may be used instead of, or in addition to, a GAN. A SIREN may be a simple multi-layer perceptron that uses a periodic sine as the non-linearity that rapidly converges to obtain functions with high frequency details. In some aspects, the space of functions parameterized by the SIREN may use a convolutional encoder to present a latent space of the images and map the parameters of the SIREN according to a fully connected hypernetwork. In some aspects a CompletionGAN may be used to generate the synthesized representation. CompletionGAN may run asynchronously from several perspectives of rasterized point clouds. In some aspects, the several perspectives of the rasterized point clouds may be different perspectives at the same moment in time. In some aspects, each point clouds of the rasterized point cloud may be captured using different sensors.

A determined region infill module 210 of the point cloud infill module 103 may use the infill mask generated by the infill mask generator 206 and the synthesized representation obtained by the synthesized representation generator 208 to determine the identity of occluded points to be infilled and further determine attributes of the identified points using the synthesized representation. For example, the determined region infill module 210 selects points or pixels of the occluded regions of the infill mask and infills the points in the point cloud to generate an augmented or infilled version of the point cloud. In some aspects, the points may be added to the rasterized 2D representation and then reconstructed into a 3D representation or may be directly added to a 3D representation that already includes the non-occluded points. In some aspects, the modified representation may undergo additional infill mask generation and synthesized representation generation steps to iteratively undergo the infill process wherein the determined region infill module 210 determines whether one or more occluded regions of the 2D representation has reached a minimum threshold of infilling.

In some aspects, an infilled point cloud generator 212 of the point cloud infill module 103 may use a modified 2D representation generated by the determined region infill module 210, wherein the modified 2D representation has the regions identified by the infill mask generator filled in with additional information to generate an infilled point cloud 214. The infilled point cloud 214 may then be used to render an infilled version of the point cloud with greater details than the original version of the point cloud. For example, the occluded regions in the original version of the point cloud may be at least partially filled with infill points in the infilled version of the point cloud. In some aspects, the infill points may be added to a 3D representation of the point cloud by the infill point cloud generator 212, without necessarily being added to modified 2D representation. For example, in some aspects, the infill points may be directly projected into a 3D representation along with non-occluded points already included in the 3D representation.

Figure 3:
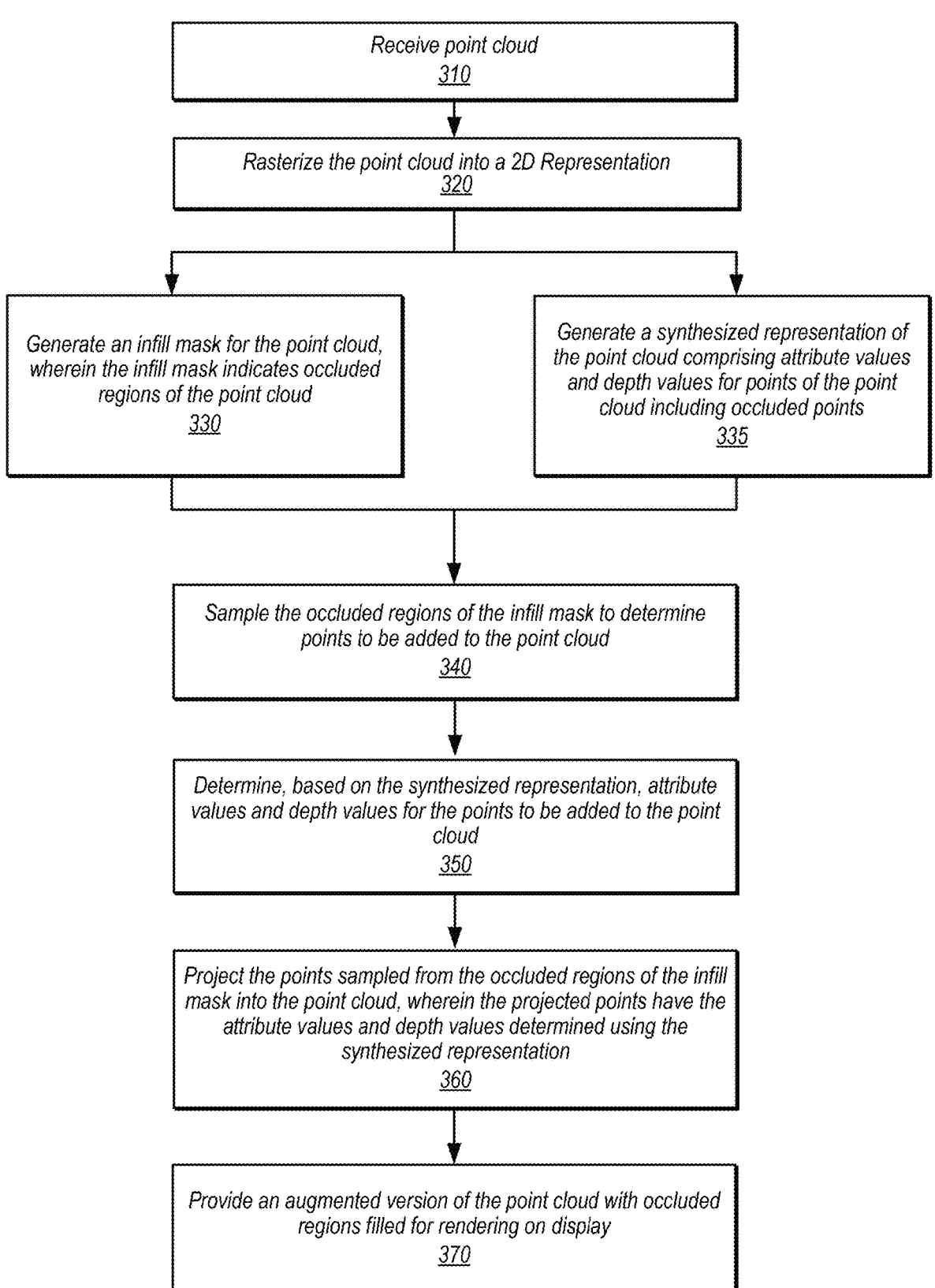
FIG. 3 is a flow diagram that illustrates operations performed by the point cloud infill module to receive a point cloud, rasterize the point cloud into a 2D version, create an infill mask, create a synthesized representation, and use the infill mask and the synthesized representation to determine attribute or depth values for points to be included in occluded regions of the point cloud, according to some aspects.
Figure 4:
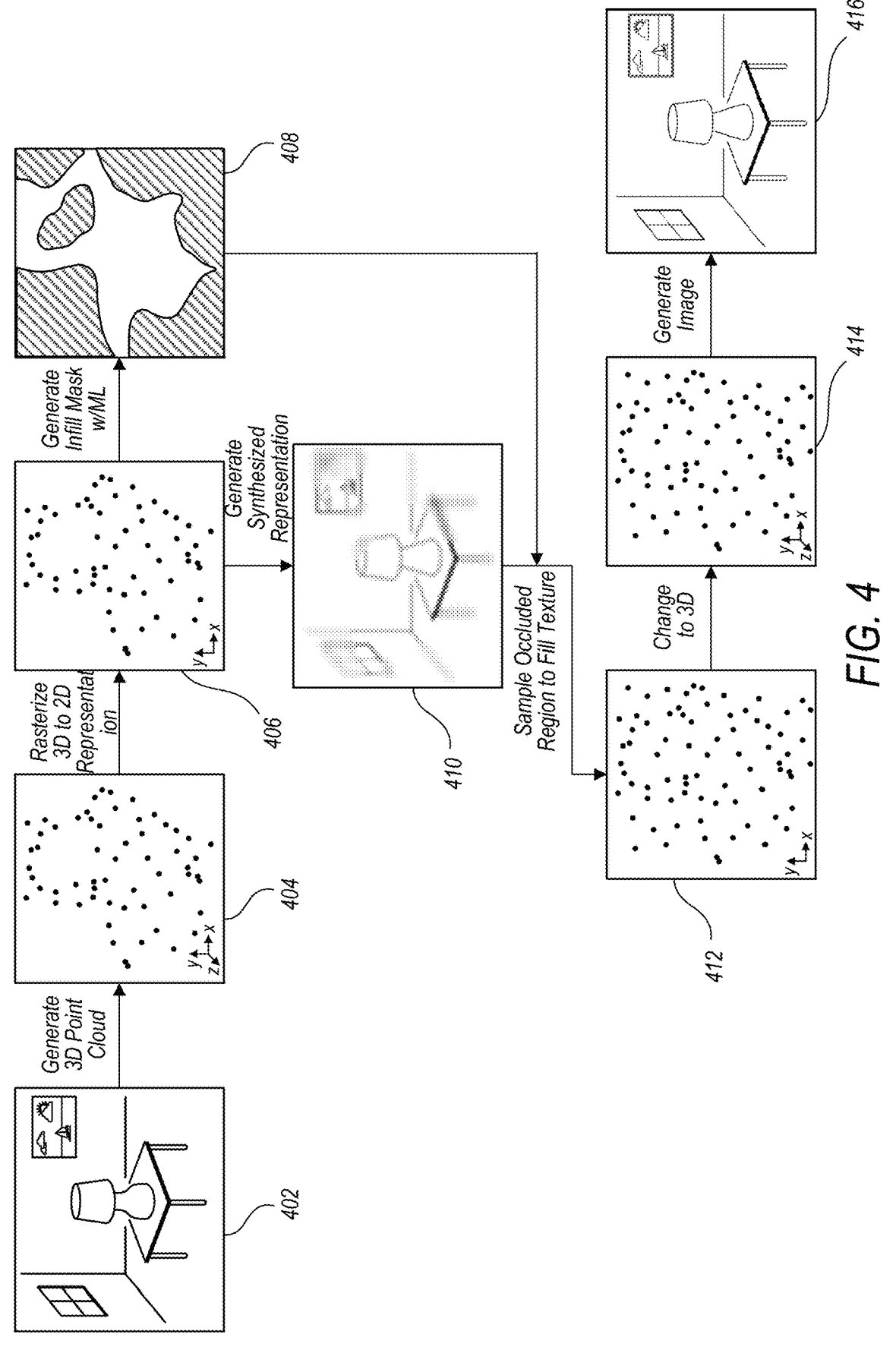
FIG. 4 further illustrates the operations performed by the point cloud infill module as descried in FIG. 3 and illustrates generating an augmented version of the point cloud with occluded regions filled in, according to some aspects.

FIG. 3 is a flow diagram that illustrates operations performed by a point cloud infill module to receive a point cloud, rasterize the point cloud, and create an infill mask, wherein pixels of a synthesized representation of the point cloud are used to provide an augmented version of the point cloud with occluded regions filled in, according to some aspects. FIG. 4 further illustrates the operations performed by the point cloud infill module as descried in FIG. 3 and illustrates generating an augmented version of the point cloud with occluded regions filled in.

At block 310 a point cloud infill module may receive a point cloud. In some aspects, various point cloud sensors including LiDAR, 3D laser scanners, digital cameras applying photogrammetry, etc., may be used to generate a point cloud of a scene, such as the ground truth scene 402 depicted in FIG. 4. In some aspects instead of point cloud sensors capturing the point cloud of the scene, such as the ground truth scene 402 of FIG. 4, a scene generator may generate a point cloud representative of a scene. In some aspects, the point cloud, such as point cloud 404 of the ground truth scene 402, may include spatial and attribute information for the points included in the point cloud. For example, the points of point cloud 404 may comprises X, Y, Z coordinates and attributes such as R, G, B color values. In some aspects, the spatial information of the points of the point cloud may be represented using 3D coordinates, such as Cartesian coordinates e.g., X, Y, and Z coordinates, radial coordinates, such as r, θ, φ, or spherical coordinates, such as r, θ, φ, etc. The 3D coordinates of the points of the point cloud 404 may be represented as floating point values, such as 32-bit floating point values or other bit range values. In some aspects, fixed point values may be used.

In some aspects, the point cloud 404 may have regions that are sparsely populated by points or that lack a sufficient number of points due to that region of the environment being occluded, which may prevent the points from being captured. For example, various regions of the environment may be occluded behind objects which act as a barrier that prevents a LiDAR systems or other point cloud sensors from obtaining information about such occluded points of the environment. In some situations, points may be occluded due to certain reflective properties of surfaces that prevent proper engagement with the sensors. For example, some portions of point cloud 404 may contain occluded regions, that may also correlate with regions sparsely populated with points, wherein the points were unable to be captured or were captured sparsely by a capture device, such as a LiDAR scanner. The point cloud 404 may include occluded regions that do not include a quantity of points needed to accurately represent a scene 402 captured by a device, such as mobile device that includes a LiDAR scanner.

At block 320, the point cloud may be rasterized an into a two-dimensional (2D) representation of the point cloud, a "2D representation". In some aspects, the 2D representation may transform one of the position values in the X, Y, and Z planes into a depth value for a pixel while retaining all of the attribute values associated with each of the points as attribute values of the pixel. For example, the point cloud 404 may be rasterized from a 3D point cloud into a 2D representation 406 as depicted in FIG. 4, wherein the 2D representation 404 stores the Z plane information as a depth value. The 2D representation 406 may be comprised of a series of pixels, dots, lines, or other shapes in the 2D space that correspond to the 3D points of the 3D point cloud. In some aspects, the 2D representation 406 may further include attribute values such as color information (e.g., RGB values), intensity attributes, reflectivity attributes, motion related attributes, modality attributes, or various other attributes associated with the points of the 3D point cloud assigned to the pixels along with depth values.

At block 330, the 2D representation generated at block 320 may be used to generate an infill mask that can be used to determine the regions of the point cloud that may require infilling. For example, FIG. 4 depicts an infill mask 408 wherein the occluded regions of the 3D point cloud 404 having sparsely populated points are depicted as a shaded region. The infill mask 408 may highlight occluded areas of the point cloud that need to be infilled to represent the ground truth scene 402 more accurately. Although the infill mask 408 is illustrated as a single layer, in some aspects there may be multiple layers and or aspects of the layer (such as points, pixels, or sub-regions) that have differing properties with respect to one another. For example, in some aspects, a point cloud may have multiple layers of points at different depths relative to a surface of the point cloud. In some aspects, the infill mask 408 or sub-regions of the infill mask 408 may have assigned probabilities or ranges showing a level of sparseness and/or density. For example, the infill mask 408 may include regions wherein the infill mask values range from 0 to 1—where the values of 1 indicate sparse regions or occluded regions that require infilling and the values of 0 indicate areas that would not require infilling. The infill mask may be generated using various machine learning models such as CNN, GANs, and cGAN. The infill mask 404 may be run multiples times to continually refine the regions of the point cloud that are identified as occluded after having been infilled during a previous iteration. In some aspects, the infill mask generator may be able to identify the regions that were previously infilled. The infill mask generator may refrain from layer the infill points on other parts of the point cloud that may have already been infilled in a previous iteration. In some aspects, a new updated infill mask and a new updated synthesized representation is generated that uses the points added as infill points in a previous round as source points for a subsequent round that are used to generate the updated infill mask and the updated network output in the subsequent round.

At block 335, a synthesized representation of the point cloud 2D representation may be generated. For example, the synthesized representation generator may generate a synthesized representation of the point cloud comprising attribute values and depth values for points of the point cloud including the occluded points. FIG. 4 illustrates a synthesized representation 410 comprising attribute values (e.g., colors and depths) for points in the regions identified by the infill mask as being occluded. The regions of the synthesized representation 410 related to the occluded regions may be blurred or less detailed than that of the non-occluded regions more densely populated by points. The synthesized representation 410 may be generated by utilizing various machine learning techniques. For example, in some aspects, a neural point-based graphics (NPBG) technique may be used to generate a synthesized representation 410. NPBG technique attaches "descriptors" to points of the point cloud, rasterizing these points into a texture or other 2D representation, and training a convolutional neural network to reproduce realistic images of the scene captured in the point cloud. In NPBG the "descriptors" of the points of the point cloud are learned for new point-cloud scenes. In some aspects, the NPBG may require backpropagation for each new scene detected by sensors. In some aspects, a simplified NPBG technique may be used wherein the neural descriptors are not learned, but instead a vector representing RGB color components and depths are considered to be the descriptors. In some aspects, the NPBG techniques may be used with 2D representations 406 from a series of versions of point cloud 404 obtained over a successive moments in time or frames. A neural network may be trained to fill in the current frame of the synthesized representation 410 using information described in the previous frames by adding one or more recurrent convolutional Long Short-Term Memory (LSTM) layers in the network. Using this technique, the network passes information from one frame to the next frame, thereby holding information on previous data the network has seen before and using it to make decisions. In some aspects, a Consistent Video Depth Estimation (CVDE) technique may be used to minimize temporal inconsistencies between multiple frames. CVDE technique may leverage a conventional structure-from-motion reconstruction of the point cloud to establish geometric constraints, apply a convolutional neural network (CNN) trained for single-image depth estimation, and fine-tune the CNN to satisfy the geometric constraints of the 2D representation.

At block 335, the various NPBG techniques discussed herein may utilize a Generative Adversarial Networks (GANs) instead of the CNN. In some aspects, the synthesized representation 410 of the scene may be obtained using GAN-based reconstruction. The various NPBG techniques discussed herein may utilize a Generative Adversarial Networks (GANs) instead of the CNN. In some aspects, a specialized conditional GAN (cGAN) network may be used to generate a more detailed synthesized representation 410 using the 2D representation 406. In some aspects, the GAN-based reconstruction may utilize 2D representations 406 from a series of versions of the point cloud obtained over successive moments in time or frames. The GAN or cGAN or other types of GANs may be trained to fill in a current frame using information described in previous frames. Using this technique, the network passes information from one frame to the next frame, thereby holding information on previous data the network has seen before and using it to make decisions. In some aspects, a TecoGAN or other elements of a TecoGAN, such as a spatio-temporal discriminator and recurrent generator network, may be used. In some aspects a Pix2Pix GAN-based reconstruction may be used to generate a synthesized representation of the scene wherein such a type of GAN not only learns the mapping from the input 2D representation to the output 2D representation but also learns a loss function to train the mapping. In some aspects, a sinusoidal representation networks (SIRENs) may be used instead of, or in addition to, a GAN. A SIREN may be a simple multi-layer perceptron that uses periodic sine as the non-linearity that rapidly converges to obtain functions with high frequency details. In some aspects, the space of functions parameterized by the SIREN may use a convolutional encoder to present a latent space of the images and map the parameters of the SIREN according to a fully connected hypernetwork. In some aspects a CompletionGAN may be used to generate the synthesized representation 410. CompletionGAN may run asynchronously from several perspectives of rasterized point clouds. In some aspects, the several perspectives of the rasterized point clouds may be different perspectives at the same moment in time. In some aspects, each point clouds of the rasterized point cloud may be captured using different sensors.

At block 340, the occluded regions identified by the infill mask are sampled from the synthesized representation of the point cloud to determine the attribute values (e.g., colors and depths) for points to be added to the point cloud. For example, pixels in the synthesized representation 406 that are correlated to pixels in the infill mask 408 regions may be sampled. At block 350, attribute values and depth values for the points sampled to be infilled are determined by looking up the information from the synthesized representation. For example, as shown in FIG. 4, the sampled points that are deemed occluded from block 340 are matched with points or pixels from the corresponding synthesized representation 410 to determine the spatial values such as the values in the X and Y plane, and other attribute values such as the depth value, color information (e.g. RGB values), intensity attributes, reflectivity attributes, motion related attributes, modality attributes, or various other attributes are determined from the attribute values of the pixels located at the corresponding X and Y locations in the synthesized representation.

At block 360 the points that are sampled from the occluded regions of the infill mask and for which attribute values are determined using the synthesized representation are projected into an augmented version of the point cloud including infill points, wherein the projected points have the attribute values and depth values determined using the synthesized representation. At block 370, the modified point cloud with the occluded points filled is provided, wherein the provided point cloud is closer to the ground truth scene. For example, FIG. 4 depicts the infilled 2D representation 412 having the occluded points from the occluded regions (as identified by infill mask 408) of the 2D representation 406 filled in with information from the synthesized representation 410. At block 370, an augmented version of the point cloud with occluded regions filled may further be provided for rendering on a display. For example, FIG. 4 depicts the infilled 2D representation 412 that is projected back into the 3D plane to generate an infilled point cloud 414 with the occluded regions filled in that may be used to generate an augmented image 416 that more closely resembles the ground truth scene 402.

FIG. 5 illustrates generation of a 2D representation of the point cloud from a 3D representation by moving one of the spatial values of the points into an additional attribute value, in some aspects. FIG. 6 further illustrates generation of an example 2D representation of the point cloud described in FIG. 5, according to some aspects. At block 310 attribute values of a point cloud and spatial information comprising information for determining locations of the points of the point cloud in three-dimensional (3D) space are received. In some aspects, as also described in FIG. 3, various point cloud sensors including LiDAR, 3D laser scanners, digital cameras applying photogrammetry, etc., may be used to generate a point cloud of a scene. In some aspects instead of point cloud sensors capturing the point cloud of the scene, a scene generator may generate point cloud representative of a scene. In some aspects, the spatial information of the points of the point cloud may be represented using 3D coordinates, Cartesian coordinates such as X, Y, and Z, radial coordinates, such as r, θ, h, or spherical coordinates, such as r, θ, φ, etc. For example, with respect to FIG. 6, the 3D coordinates of the points of a point cloud 404 is shown to be in the X, Y, and Z planes. In some aspects, the points of the point cloud 404 may further comprise attribute values such as color information (e.g., RGB values), intensity attributes, reflectivity attributes, motion related attributes, modality attributes, or various other attributes.

At block 520, the attribute values and spatial information for points of the point cloud received at block 310 may be used to generate a two-dimensional (2D) representation of the point cloud, wherein depth values of the points of the point cloud in 3D space are represented as a depth value of pixels in the 2D representation that correspond to the points of the point cloud in 3D space. This is further illustrated in FIG. 6 with the 2D representation of point cloud 604. In some aspects, point cloud 404 may be rasterized from a 3D point cloud into a 2D representation 604 that may comprise pixels 606, 608 as illustrated in FIG. 6. In other aspects, the 2D representation 604 may comprise dots, lines, or other shapes corresponding to the 3D point cloud information. Each of the pixels 606, 608 of the 2D representation 604 may not only contain spatial information but may further include attribute values such as color information (e.g., RGB values), intensity attributes, reflectivity attributes, motion related attributes, modality attributes, or various other attributes.

At block 330 of FIG. 5, the 2D representation generated at block 520 may be used to generate an infill mask that determines the occluded regions of the 2D representation that may require infilling, in a similar manner as in bock 330 of FIG. 3. In some aspects, the infill mask or sub-regions of the infill mask may have probabilities or ranges showing the level of sparseness and density. For example, FIG. 6 illustrates an infill mask 609 overlaid over the 2D representation 604 marking the boundaries of the empty pixels. In some aspects, the infill mask 609, may have regions wherein the infill mask value ranges from 0 to 1—the values of 1 indicate sparse regions or occluded regions that require infilling whereas 0 indicates areas that would not require infilling. For example, FIG. 6 depicts an infill mask pixel having a probability 610 of requiring infilling. In some aspects, the infill mask 609 may be redrawn based on a threshold probability of infilling required. Although the infill mask 609 is illustrated as a single region covering multiple pixels, this is for the sake of clarity of illustration. In some aspects, the infill mask 408 may have probabilities or mask ranges showing the level of sparseness and density. For example, the infill mask 609 may have regions wherein the infill mask value ranges from 0 to 1—the values of 1 indicates sparse regions or occluded regions that require infilling whereas 0 indicates areas that would not require infilling. The infill mask 609 may be generated using machine learning techniques as described in FIG. 3. The infill mask that is generated by the point cloud infill mask generator 206 may be run multiples times to continually refine the area of the point cloud that are identified as occluded. In some aspects the infill mask generator may be able to identify the region that were previously infilled and do not layer the infill points on other parts of the point cloud that may have already been infilled in a previous iteration. In some aspects, a new updated infill mask and a new synthesized representation is generated that uses the points added as infill points in the first round as source points that are used to generate the updated infill mask and the updated synthetic representation, which may also be referred to as a network output.

At block 335, a synthesized representation of the point cloud 2D representation is generated using the 2D representation point cloud rasterization module. For example, the synthesized representation generator may generate a synthesized representation of the point cloud comprising attribute values and depth values for points of the point cloud including the occluded points as illustrated in FIG. 6 by synthesized representation 410 which comprises attribute values for pixels/points of the regions identified by the infill mask as being occluded.

FIG. 7 illustrates use of temporal correlations between the plurality of frames of the point cloud to generate the infill masks and the synthesized representations, according to some aspects. FIG. 8 further illustrates an example use of temporal correlations between the plurality of frames of the point cloud to generate the infill masks and the synthesized representations, according to some aspects.

At block 710, attribute values and spatial information for a plurality of frames of the point cloud corresponding to versions of the point cloud at plurality of moments in time is received. For example, FIG. 8 illustrates point cloud at time $T_1$ 802, point cloud at time $T_2$, 806 and point cloud at time $T_n$ 810. In some aspects, the points of point clouds 802, 806, 810 may comprises X, Y, Z coordinates and attributes such as R, G, B color values, a velocity at the point, an acceleration at the point, a reflectance of the structure at the point, etc. In some aspects, the point clouds 802, 806, 810 may differ in the number, placement, and attributes of the points in accordance with the differences in the scenes captured at each of the times. In some aspects, the point clouds 802, 806, 810 may differ in their respective occluded regions.

At block 720, 2D representations for the point cloud for respective ones of the frames are generated. For example, FIG. 8 illustrates 2D representations at time $T_1$ 804, point cloud at time $T_2$, 808 and point cloud at time $T_n$ 812. The point clouds at each of the times 802, 806, 810 may be rasterized into the respective 2D representations, such as the point cloud at time $T_1$ 804, the point cloud at time $T_2$, 808 and the point cloud at time $T_n$ 812. In some aspects, the 2D representations may transform one of the position values in the X, Y, and Z planes into a depth value while retaining all of the attribute values associated with each of the points. For example, the point cloud at $T_1$ 802 may be rasterized from 3D point cloud into 2D representation at $T_1$ 804 as depicted in FIG. 8, wherein the 2D representation at $T_1$ 804 stores the Z plane information as a depth value. In some aspects, the 2D representation 406 may further include attribute values such as color information (e.g., RGB values), intensity attributes, reflectivity attributes, motion related attributes, modality attributes, or various other attributes associated with the points of the 3D point clouds 802, 806, 810. In some aspects, the 2D representations 804, 808, 812 may differ in the number, placement, and attributes of the points in accordance with the differences in the scenes captured at each of the times, as illustrated by the different pixels being shaded in.

At block 730, temporal correlations between the plurality of frames of the point cloud are used to generate the infill mask and the synthesized representation. FIG. 8 illustrates infill mask at time $T_1$ 816/synthesized representation at time $T_1$ 818 and infill mask at time $T_m$ 822 and synthesized representation at time $T_m$ 824. In some aspects, the infill mask and the synthesized representation may utilize those of the previous times to generate the masks and synthesized representations. For example, the infill mask at $T_m$ 822 may identify the occluded regions that were identified at $T_1$ 816 and generate the infill mask at $T_m$ 822 that strategically excludes infill mask whose already been infilled at a previous moment in time prior to the scene or the camera angle being changed through between time $T_1$ 816 and time $T_m$ 822. The infill mask at time $T_1$ 816 and infill mask at time $T_m$ 822 therefore would only match with points or pixels from the corresponding synthesized representation at time $T_1$ 818 and synthesized representation at time $T_n$ 824. In other embodiments, instead of the infill masks considering and excluding those regions that have previously been infilled, the module selecting the points from the infill masks to be sampled would consider previously infilled regions of the infill mask and exclude them from being sampled FIG. 9 illustrates iterative generation of infill masks and synthesized representations, according to some aspects. FIG. 10 further illustrates an example use of iterative generation of infill masks and synthesized representations, according to some aspects. At block 910 a point cloud infill module may receive a point cloud. In some aspects, the point cloud may have regions that are sparsely populated by points or lacking sufficient number of points due to that region of the environment being occluded and preventing the points from being captured.

At block 920, the point cloud may be rasterized an into a 2D representation of the point cloud. In some aspects, the 2D representation may transform one of the position values in the X, Y, and Z planes into a depth value while retaining all of the attribute values associated with each of the points. For example, as illustrated in FIG. 10, a point cloud may be rasterized from 3D point cloud into 2D representation 1002, wherein the 2D representation 1002 stores the Z plane information as a depth value.

At block 930, the 2D representation generated at block 920 may be used to generate an infill mask that determines the regions of the 2D representation that may require infilling. For example, FIG. 10 depicts an infill mask 1004 wherein the occluded regions of the 3D point cloud 404 having sparsely populated points are depicted as a shaded region. The infill mask 1004 may highlight occluded areas of the point cloud that need to be infilled to represent the ground truth scene more accurately. Although the infill mask 1004 is illustrated as a single layer, in some aspects there may be multiple layers and or aspects of the layer (such as points, pixels, or sub-regions) that have differing properties with respect to one another as described in FIGS. 5-6.

At block 940, a synthesized representation of the point cloud in 2D may be generated. For example, the synthesized representation generator may generate a synthesized representation of the point cloud comprising attribute values and depth values for points of the point cloud including the occluded points. FIG. 10 illustrates a synthesized representation 1006 containing the regions identified by the infill mask as being occluded. The regions of the synthesized representation 1006 related to the occluded regions may be blurred or less detailed than that of the non-occluded regions more densely populated by points. The synthesized representation 1006 may be generated by utilizing various machine learning techniques as described in FIGS. 3-4.

At block 950, the occluded regions identified by the infill mask is sampled from the synthesized representation of the point cloud to determine the points to be added to the point cloud. For example, the areas of the synthesized representation 1006 that are correlated to the sparse infill mask 1004 regions may be sampled. At block 960, attribute values and depth values for the points sampled to be infilled are determined by looking up the information from the synthesized representation. For example, as shown in FIG. 10, the sampled points that are deemed occluded from block 950 are matched with points or pixels from the corresponding synthesized representation 1006 to determine the spatial values such as the values in the X and Y plane, and other attribute values such as the depth value, color information (e.g., RGB values), intensity attributes, reflectivity attributes, motion related attributes, modality attributes, or various other attributes. At block 970, the points that are sampled from the occluded regions of the infill mask are projected on to the 2D representation and/or directly projected into 3D space, wherein the projected points have the attribute values and depth values determined using the synthesized representation. For example, FIG. 10 depicts the infilled 2D representation 1008 having the occluded points from the occluded regions (as identified by infill mask 1004) of the 2D representation 1002 filled in with information from the synthesized representation 1006.

At block 980, a check is made to determine whether the occluded region has reached a minimum threshold of infilling. If the minimum threshold is not reached, the infill mask generation/synthesized representation generation and infilling (as described from blocks 940 to 970) may be run multiples times to continually refine the areas of the point cloud that are identified as occluded after having been infilled. For example, FIG. 10 illustrates a second iteration of the infill mask 1010 and second iteration of the synthesized representation 1012 being generated from the infilled 2D representation 1008. In some aspects the infill mask generator may be able to identify the regions that were previously infilled and refrain from layering the infill points on other parts of the point cloud that may have already been infilled in a previous iteration. In some aspects, a new updated infill mask and a new network output is generated that uses the points added as infill points in the first round as source points that are used to generate the updated infill mask and the updated network output. Once it is determined that the occluded regions have reached the minimum threshold of infilling the iteratively infilled 2D representation may be determined. For example, FIG. 10 illustrates iteratively infilled 2D representation 1014 that has undergone two iterations of infilling.

At block 990, an augmented version of the point cloud with occluded regions infilled for rendering is provided to a display. For example, FIG. 10 depicts the iteratively infilled 2D representation 1014 that is projected back into the 3D plane to generate an iteratively infilled point cloud 1016 with the occluded regions filled in that may be used to generate an augmented image 1018 that more closely resembles the ground truth scene.

FIG. 11 illustrates exemplary computer system 1100 usable to implement the point cloud infill module as described above with reference to FIGS. 1-10. In different embodiments, computer system 1100 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of program instructions for generating infill masks, creating synthesized representative, infilling points, encoding or decoding a point cloud, as described herein, may be executed in one or more computer systems 1100, which may interact with various other devices, such as a LiDAR. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such computer systems, or multiple nodes making up computer system 1100, may be configured to host different portions or instances program instructions for re-mapping, rendering, encoding, or decoding points cloud as described above for various embodiments. For example, in one embodiment some elements of the program instructions may be implemented via one or more nodes of computer system 1100 that are distinct from those nodes implementing other elements.

In some embodiments, computer system 1100 may be implemented as a system on a chip (SoC). For example, in some embodiments, processors 1110, memory 1120, I/O interface 1130 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1120 may be configured to store compression or decompression program instructions 1122 and/or sensor data accessible by processor 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions 1122 may be configured to implement any of the functionality described above. In some embodiments, program instructions and/or data may be received, sent or stored upon different types of computer-accessible media or on similar media separate from system memory 1120 or computer system 1100.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or access- ing data by one or more computer systems 1100. Multiple input/output devices 1150 may be present in computer system 1100 or may be distributed on various nodes of computer system 1100. In some embodiments, similar input/ output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included.

Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the function- ality of some of the illustrated components may not be provided and/or other additional functionality may be avail- able.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer sys- tem via inter-computer communication. Some or all of the system components or data structures may also be stored (e.g., as instructions or structured data) on a computer- accessible medium or a portable article to be read by an appropriate drive, various examples of which are described above. In some embodiments, instructions stored on a com- puter-accessible medium separate from computer system 1100 may be transmitted to computer system 1100 via transmission media or signals such as electrical, electromag- netic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many varia- tions, modifications, additions, and improvements are pos- sible. Accordingly, plural instances may be provided for components described herein as a single instance. Bound- aries between various components, operations and data stores are somewhat arbitrary, and particular operations are illustrated in the context of specific illustrative configura- tions. Other allocations of functionality are envisioned and may fall within the scope of claims that follow. Finally, structures and functionality presented as discrete compo- nents in the example configurations may be implemented as a combined structure or component. These and other varia- tions, modifications, additions, and improvements may fall within the scope of embodiments as defined in the claims that follow

What is claimed is:

1. A non-transitory computer-readable medium storing program instructions that, when executed using one or more processors, cause the one or more processors to:

generate, using a first machine learning algorithm, an infill mask for a point cloud, wherein the infill mask indicates occluded regions of the point cloud;

generate, using a second machine learning algorithm, a synthesized representation of the point cloud compris- ing attribute values and depth values for points of the point cloud including occluded points; and at least partially infill occluded regions of the point cloud, wherein to infill the occluded regions, the program instructions cause the one or more processors to:

select points to be added to the point cloud amongst the occluded regions indicated in the infill mask;

determine, based on the synthesized representation, attribute values and depth values for the points selected to be added to the point cloud;

at least partially infill the occluded regions of the point cloud using the determined attribute values and depth values for the points to be added to the point cloud; and cause the point cloud comprising infilled points to be rendered on a display of a device.

2. The non-transitory computer-readable medium of claim 1, wherein the point cloud comprises points located in three-dimensional (3D) space, and wherein:

the infill mask comprises a two-dimensional (2D) image comprising pixels located at width and height locations corresponding to width and height dimensions of the point cloud, wherein the pixels of the infill mask further comprise an infill value indicating a probability of whether a corresponding point in the point cloud at the width and height dimensions corresponding to the width and height location of the pixel is an occluded point;

the synthesized representation comprises a 2D image comprising pixels located at width and height locations corresponding to the width and the height dimensions of the point cloud, wherein the pixels of the synthesized representation further comprise pixel values indicating one or more attribute values and a depth value for a correspond- ing point in the point cloud located at a width and a height dimension corresponding to the width and height location of the pixel in the synthesized representation.

3. The non-transitory computer-readable medium of claim 2, wherein the program instructions, when executed using the one or more processors, further cause the one or more processors to:

receive attribute values and spatial information for points of the point cloud, wherein the spatial information comprises information for determining locations of the points of the point cloud in three-dimensional (3D) space, generate, based on the received attribute values and spatial information, a two-dimensional (2D) representation of the point cloud, wherein depth values of the points of the point cloud in 3D space are represented as an additional attribute value of pixels in the 2D representation that correspond to the points of the point cloud in 3D space;

wherein the 2D image of the infill mask and the 2D image of the synthesized representation are generated by the first machine learning algorithm and the second machine learning algorithm using the 2D representation of the point cloud as an input to the respective machine learning algorithms.

4. The non-transitory computer-readable medium of claim 3, wherein the program instructions, when executed using the one or more processors, further cause the one or more processors to:

receive attribute values and spatial information for a plurality of frames of the point cloud corresponding to versions of the point cloud at plurality of moments in time; and generate 2D representations for the point cloud for respective ones of the frames, wherein the first and second machine learning algorithms further use temporal correlations between the plurality of frames of the point cloud to generate the infill mask and the synthesized representation.

5. The non-transitory computer readable medium of claim 4, wherein the second machine learning algorithm comprises:

recurrent convolutional long short-term memory (LSTM) layers that utilize the plurality of frames to generate the synthesized representation of the point cloud comprising the attribute values and the depth values for the points of the point cloud including the occluded points.

6. The non-transitory computer readable medium of claim 4, wherein the second machine learning algorithm comprises:

a recurrent generative adversarial network (GAN) that utilize the plurality of frames to generate the synthesized representation of the point cloud comprising the attribute values and the depth values for the points of the point cloud including the occluded points.

7. The non-transitory computer-readable medium of claim 2, wherein the program instructions, when executed using the one or more processors, further cause the one or more processors to:

up-scale the point cloud in the height, width, or depth direction, wherein the infill mask and the synthesized representation are generated for the up-scaled version of the point cloud.

8. The non-transitory computer-readable medium of claim 1, wherein the machine learning algorithm that generates the infill mask is trained to differentiate between occluded regions and naturally sparse regions of the point cloud.

9. The non-transitory computer-readable medium of claim 1, wherein to generate the infill mask, the program instructions, when executed using the one or more processors, further cause the one or more processors to:

determine depth gradients between sets of points of the point cloud; and for points in one or more regions of the point cloud with a depth gradient greater than a threshold value exempt the points in the one or more regions with high depth gradients from being candidates for sampling for points to be added to the point cloud.

10. The non-transitory computer-readable medium of claim 1, wherein the second machine learning algorithm comprises:

a generative adversarial (GAN) network.

11. The non-transitory computer-readable medium of claim 1, wherein the second machine learning algorithm comprises:

a sinusoidal representation network.

12. The non-transitory computer-readable medium of claim 1, wherein to generate the infill mask, the program instructions, when executed using the one or more processors, further cause the one or more processors to:

apply object heuristics to identify objects in the point cloud; and use the identified objects to determine occluded regions of the point cloud.

13. A device comprising:

a display;

a memory storing program instructions; and one or more processors, wherein the program instructions, when executed using the one or more processors, cause the one or more processors to:

generate, via a first machine learning algorithm, an infill mask for a point cloud, wherein the infill mask indicates occluded regions of the point cloud;

generate, via a second machine learning algorithm, a synthesized representation of the point cloud comprising attribute values and depth values for points of the point cloud including occluded point; and at least partially infill the occluded regions of the point cloud, wherein to infill the occluded regions, the program instructions cause the one or more processors to:

sample the occluded-regions of the infill mask to determine points to be added to the point cloud;

determine, based on the synthesized representation, attribute values and depth values for the points to be added to the point cloud;

project the points sampled from the occluded regions of the infill mask into the point cloud, wherein the projected points have the attribute values and depth values determined using the synthesized representation; and cause the point cloud comprising infilled points to be rendered on the display of the device.

14. The device of claim 13, further comprising:

a LiDAR sensor, wherein the program instructions, when executed using the one or more processors, further cause the one or more processors to:

cause the point cloud to be captured using the LiDAR sensor of the device.

15. The device of claim 14, wherein the program instructions, when executed using the one or more processors, further cause the one or more processors to:

encode spatial information and attribute information for the point cloud comprising infilled points.

16. The device of claim 13, wherein the program instructions, when executed using the one or more processors, further cause the one or more processors to:

receive an encoded bit stream comprising attribute values and spatial information for points of the point cloud; and decode the encode bit stream to determine the attribute values and spatial information for the points of the point cloud.

17. The device of claim 16, wherein the program instructions, when executed using the one or more processors, further cause the one or more processors to:

generate, based on the decoded attribute values and spatial information, a two-dimensional (2D) representation of the point cloud, wherein depth values of the points of the point cloud in 3D space are represented as an additional attribute value of pixels in the 2D representation that correspond to the points of the point cloud in 3D space;

wherein the 2D image of the infill mask and the 2D image of the synthesized representation are generated by the first machine learning algorithm and the second machine learning algorithm using the 2D representation of the point cloud as an input to the respective machine learning algorithms.

18. A method, comprising:

generating, via a first machine learning algorithm, an infill mask for a point cloud, wherein the infill mask indicates occluded regions of the point cloud;

generating, via a second machine learning algorithm, a synthesized representation of the point cloud comprising attribute values and depth values for points of the point cloud including occluded points;

at least partially filling the occluded regions of the point cloud, wherein performing said filling the occluded regions comprises:

sampling the occluded-regions of the infill mask to determine points to be added to the point cloud;

determining, based on the synthesized representation, attribute values and depth values for the points to be added to the point cloud; and projecting the points sampled from the occluded regions of the infill mask into the point cloud, wherein the projected points have the attribute values and depth values determined using the synthesized representation; and causing the point cloud comprising infilled points to be rendered on a display of a device.

19. The method of claim 18, wherein the second machine learning algorithm comprises one or more of:

a generative adversarial (GAN) network; or a sinusoidal representation network.

\* \* \* \* \*